July 15, 1947.  K. BAUMANN  2,423,820
TRANSMISSION GEARING FOR POWER PLANTS
Filed Jan. 6, 1944  3 Sheets-Sheet 1
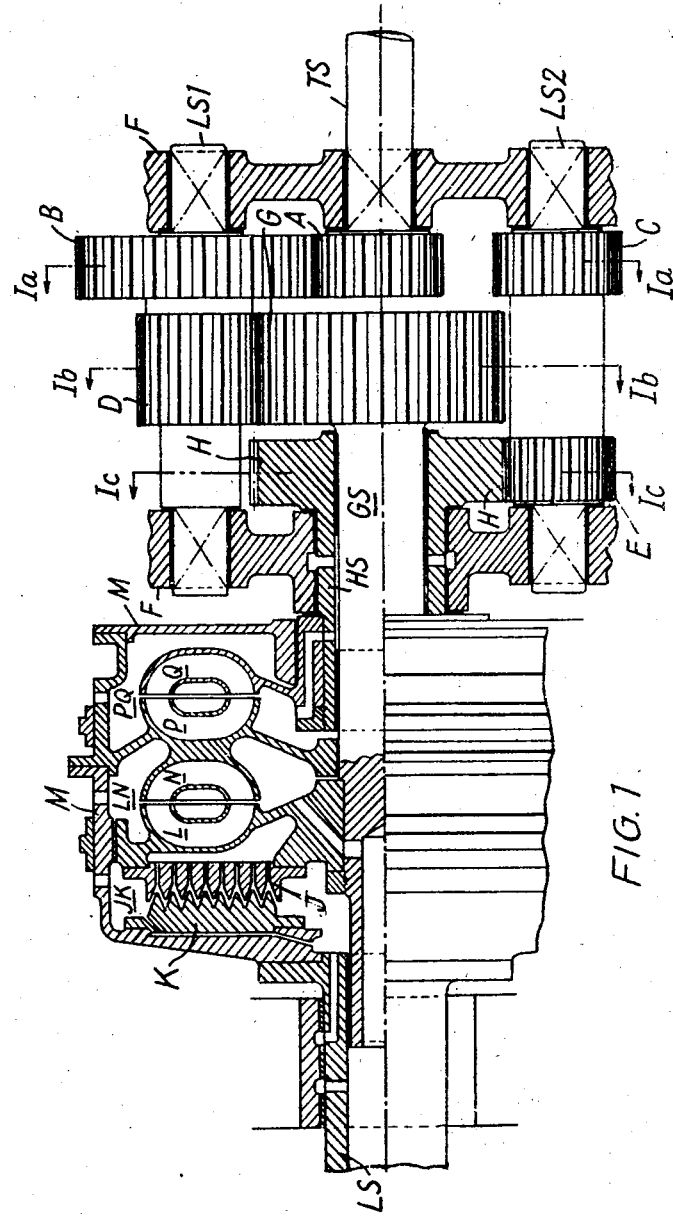
FIG. 1
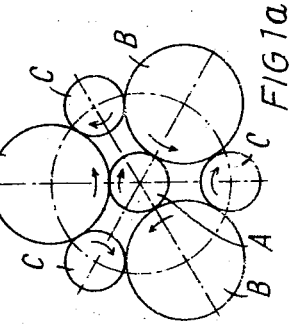
FIG. 1a
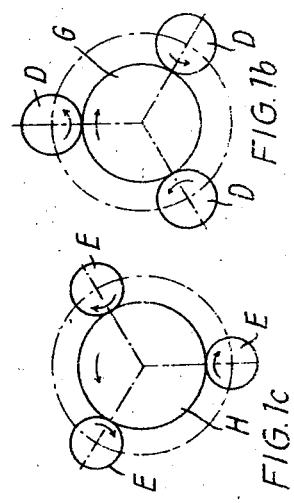
FIG. 1b
FIG. 1c
INVENTOR
Karl Baumann
BY Loyd Hall Sutton
ATTORNEY July 15, 1947.    K. BAUMANN    2,423,820
TRANSMISSION GEARING FOR POWER PLANTS
Filed Jan. 6, 1944    3 Sheets-Sheet 2
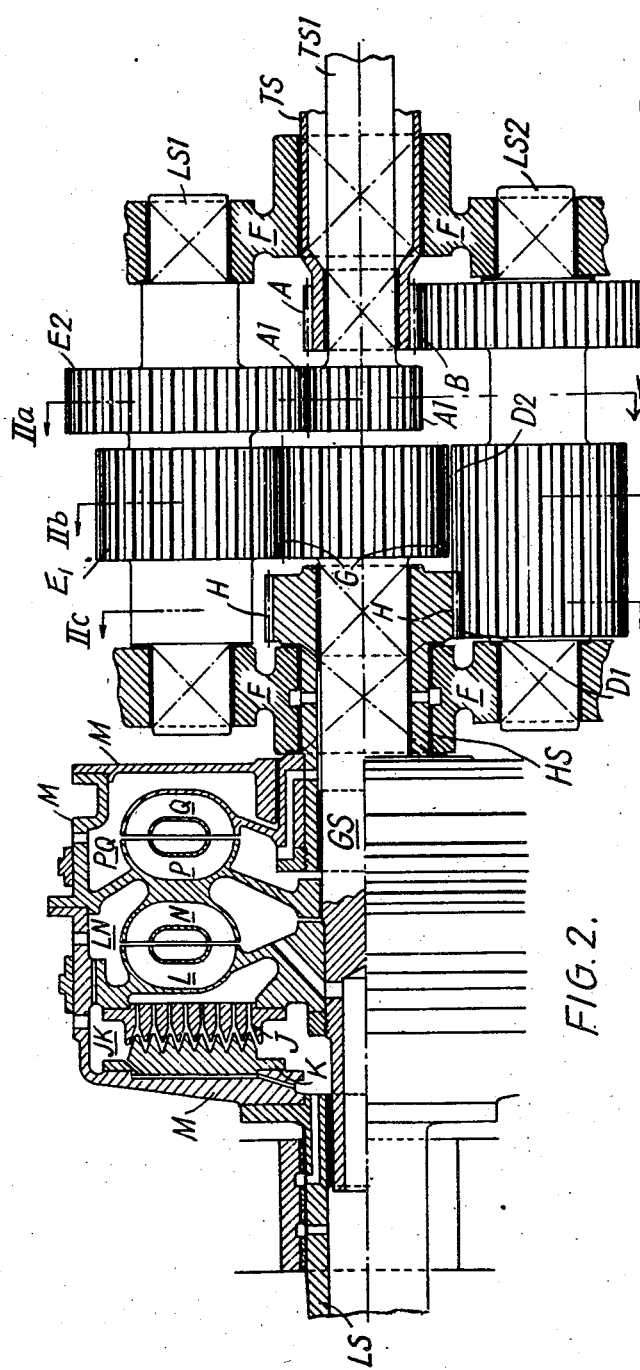
INVENTOR
Karl Baumann
BY Loyd Hall Sutton
ATTORNEY

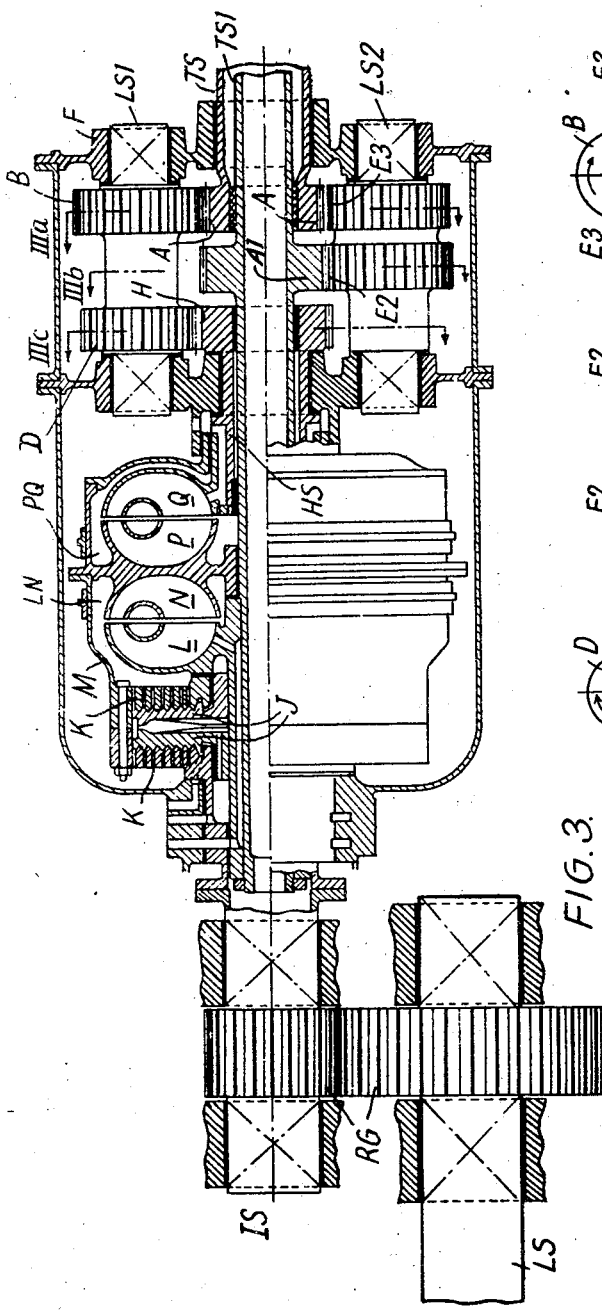
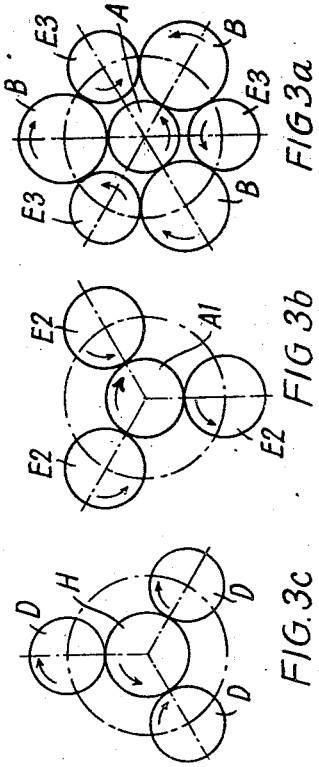

Patented July 15, 1947

2,423,820

UNITED STATES PATENT OFFICE 2,423,820

TRANSMISSION GEARING FOR
POWER PLANTS

Karl Baumann, Knutsford, England, assignor to
Metropolitan-Vickers Electrical Company Limited, London, England, a company of Great
Britain Application January 6, 1944, Serial No. 517,269
In Great Britain August 18, 1942

14 Claims. (Cl. 74—189.5)

Section 1, Public Law 690, August 8, 1946.
Patent expires August 18, 1962

This invention relates to power plants comprising elastic fluid turbines driving load shafts through transmission gearing which may give speed reduction, and the invention is more particularly, though not exclusively, applicable to the propulsion of ships, vehicles, and other mobile craft, such as military tanks. The invention is notably applicable for the propulsion of craft ahead or astern at will by a turbine plant of the internal combustion or gas type comprising a turbine driving a compressor for the air needed in its own internal combustion chamber, this turbine providing a substantial exhaust which is used to drive a preferably separate turbine unit, although surplus mechanical power of the turbine driving the compressor may be used to drive a single load shaft.

It will be understood that said load shaft may drive any desired final load device or several final load devices (such as one or more marine propellers) either directly or through final gearing (which by itself may give the required or additional speed reduction) in the case of a single load device or in the case of several final load devices at least one of the latter can be coupled to the load shaft through final gearing.

The present invention may be considered as an improvement in, or modification of, and/or be considered wholly or in part cognate with, the invention set forth in my U. S. application Serial No. 517,268, filed January 6, 1944. In that specification the speed reduction gearing described is of the planet type driven by contra-rotational turbine members, but in power plants with which the present invention is concerned the transmission gearing is not of the planet type but essentially involves concentric type gearing on lay shafts which are on fixed axes and carry a system of co-operating intermediate gear wheels, these being on the one hand driven by the turbine rotor in the case of a unidirectional turbine, or by both of the contra-rotational shafts in the case of a contra-rotational turbine, and on the other hand driving normally continuously oppositely rotating members (one of which however may be one shaft of a contra-rotational turbine) and these members are adapted to be connected to the aforesaid load shaft through two independently controllable clutches which are of a per se known type capable during slipping of absorbing considerable power, the arrangement being such that by appropriately selected operation (as hereinafter described) of these clutches, the load shaft may be driven in one direction or the other, or stopped with the turbine still rotating, preferably at a reduced speed. The intermediate and lay shaft gearing may assume various forms, examples of which are hereinafter described. Preferably there is a third clutch which is of the mechanical friction type and need not be capable of absorbing much power, this clutch being associated with one of the power-absorbing clutches so as positively to transmit the drive in one direction of rotation (preferably "ahead") to the load shaft whereby slipping of the associated power-absorbing clutch can be avoided. The two power-absorbing clutches are preferably of the fluid-operating or so-called "hydraulic" type using oil, and for simplicity will be hereinafter referred to as hydraulic clutches whilst the third clutch will be referred to as the friction clutch.

Hereinafter for convenience of description the different directions of rotation of the load shaft and other shaft members will be referred to as "ahead" and "astern," but obviously with respect to the propulsion of any particular craft the direction of travel of the latter may be respectively "astern" and "ahead" when the clutches are controlled as hereinafter described.

For convenience or simplicity in construction of the gear combination as above set forth according to the invention, of the two pairs of co-operating halves or elements of the two hydraulic clutches, one element of one clutch may be integral with, or rigidly connected with, the adjacent element of the other clutch.

The aforesaid oppositely rotating members are conveniently coaxial shaft members of which one (for astern running) may be in the form of a sleeve surrounding a solid shaft (for ahead running), these shaft members in any case being rigid with the respective "free" elements of the two power-absorbent clutches whilst the rigidly connected elements of the two clutches may be, and preferably are, rigid with the load shaft. When the friction clutch is provided, one member thereof may be rigid with the load shaft and its other member rigid with the ahead shaft member and thus rigid with that hydraulic clutch element which is rigid with said ahead shaft member; when this hydraulic clutch is filled to drive the load shaft ahead, the other hydraulic clutch is empty. If the friction clutch is present, its members may be engaged, when the ahead hydraulic clutch can be emptied.

The other hydraulic clutch is used when filled for driving the load shaft astern, at which time the ahead clutch is empty and the friction clutch, if any, disengaged. This other hydraulic clutch, which may conveniently hereinafter be called the astern hydraulic clutch, when filled during forward rotation of the load shaft, applies braking action to that shaft, while when the ahead clutch is filled at the same time these two clutches absorb the idling load of the turbine as is required when slowing down the driven shaft when it has way on it, for stopping the craft or for changing from ahead to astern running and vice versa. It will be appreciated that if it is desired in the case of a turbine of the contra-rotational type to determine numerical equality of speed of the two elements, the latter should be mutually geared together through the medium of a stationary member. This can be conveniently achieved in transmission gear according to the present invention as will hereinafter appear. In the case of a single rotation turbine it is desirable that the ahead and astern shaft members aforesaid are similarly mutually geared.

In order that the invention may be fully understood reference will now be made, by way of example, to the accompanying somewhat diagrammatic drawings, in which:

Fig. 1 is a part-elevational, part-sectional view as seen transversely of the longitudinal axis, of one arrangement of transmission gearing for use in conjunction with a turbine of the unidirectional type in a power plant according to the invention, Figs. 1a, 1b and 1c are simplified cross-sectional views, to reduced scale, taken along the lines Ia—Ia, Ib—Ib and Ic—Ic respectively of Fig. 1, Fig. 2 is a part-sectional, part-elevational view, as seen transversely of the longitudinal axis, of an arrangement of transmission gearing for use in conjunction with a contra-rotational turbine in a power plant according to the invention, Figs. 2a, 2b and 2c are simplified cross-sectional views, to reduced scale, taken along the lines IIa—IIa, IIb—IIb and IIc—IIc respectively of Fig. 2, Fig. 3 is a part-elevational, part-sectional view, as seen transversely of the longitudinal axis, of another arrangement of transmission gearing for use in conjunction with a contra-rotational turbine in power plant according to the invention, and Figs. 3a, 3b and 3c are simplified cross-sectional views, to reduced scale, taken along the lines IIIa—IIIa, IIIb—IIIb and IIIc—IIIc respectively of Fig. 3; like parts in the several figures are indicated by like reference characters.

In the arrangement illustrated in Figs. 1, 1a, 1b and 1c the driving shafting comprises a turbine shaft, indicated at TS, which has fixed to it a pinion A. This pinion A has meshed with it a plurality, in this case three, of circularly distributed gear wheels B carried on respective lay shafts LS1 journalled in frame members F so that their axes are fixed and parallel to the axis of the shaft TS. These gear wheels B have also meshed with them a plurality, in this case three, of circularly distributed gear wheels C, carried on respective lay shafts LS2 journalled in the frame F with their axes fixed and parallel with the shaft TS. As will be appreciated from consideration of Fig. 1a, the lay shafts LS1 are staggered relatively to, or individually intermediate between, the lay shafts LS2 so that the gear wheels B and C meshing together constitute a closed gear train with the gear wheels B driven in one direction, say counterclockwise as indicated in Fig. 1a, while the gear wheels C are rotated in the opposite, that is clockwise direction.

The lay shafts LS1 carry respective pinions D spaced axially from the gear wheels B and arranged to mesh with a gear wheel G fast to a shaft GS; the lay shaft LS2 carry pinions E axially spaced from the gear wheels C and arranged in mesh with gear wheel H which is rigid with a sleeve shaft HS surrounding and concentric with the aforesaid shaft GS.

With the arrangement so far described it will be appreciated that, with the turbine shaft TS operating normally in one direction, the shaft GS will be continuously rotated thereby in one direction whilst the shaft HS will be continuously rotated in the opposite direction; for purposes of identification, shaft GS is herein referred to as the "ahead" driven shaft whilst the shaft HS is referred to as the "astern" driven shaft, it being generally contemplated that, in the case of a propelled craft, the shaft GS will be coupled by the transmission gearing to the load shaft for establishing ahead running conditions and shaft HS will be coupled to the load shaft for establishing astern running conditions, though this is not essential. The diameter of the various meshing gear wheels and pinions described will be chosen to give the desired speed ratio between the turbine shaft TS and the shafts HS and GS and thus the load shaft presently to be referred to; in the exemplifying arrangement illustrated in the drawing, the gear wheels B are larger than both the pinions A and D whilst the gear wheels C are smaller than the gear wheels B with which they mesh.

At LS is indicated a hollow load shaft; it will be appreciated that in the case of a ship or other vessel, this load shaft may be the propeller shaft or a shaft coupled to the propeller shaft, either directly or through speed reduction gearing, where the gearing illustrated does not afford the desired speed reduction. As shown, in the arrangement being described, the load shaft LS provides a bearing for the ahead driven shaft GS.

Rigid with the load shaft LS is a casing M within which, and surrounding the shafts GS and HS, are disposed a mechanical friction clutch JK, which need not be capable of absorbing much power, and two clutches LN and PQ respectively which are capable each of absorbing appreciable power, the casing M moreover forming a bearing for the astern driven sleeve shaft HS. Of the two co-operating elements of the friction clutch JK, one element K is rigid with the casing M, and thus with the load shaft LS, whilst the other element J is rigid with the ahead driven shaft which in this case it surrounds. The power-absorbent clutches LN and PQ are similar to one another and are of the well known so-called "hydraulic" type, though preferably operating with oil as the working fluid. Of the two co-operating fluid-connectable elements of the clutch LN, one element L is rigid with the friction clutch element J and with the ahead driven shaft GS; the other element N is rigid with one element P of the co-operating fluid-connectable elements P and Q for the other clutch PQ and is also rigid with the casing M and therewith rotatable relatively to the ahead driven shaft GS and the astern driven shaft HS but rigid with the load shaft LS; the element Q of the clutch PQ is rigid with the astern driven shaft HS.

The power-absorbent clutches LN and PQ are independently controllable, the co-operating elements of each clutch being relatively movable when the clutch is empty of working fluid or substantially so, whilst having but little relative movement when the clutch is fully filled with working fluid.

With the hydraulic clutches LN and PQ both empty and the friction clutch JK operated, that is, with the co-operating parts K and J engaged, the load shaft LS will be coupled to the ahead driven shaft GS, and thus driven by the turbine in what may be conveniently referred to as the ahead direction, this direction being in the case of a ship or other mobile craft appropriate for running ahead.

For stopping the craft, the energy input to the turbine will be reduced, conveniently by fuel control and the hydraulic clutches LN and PQ will be filled or partially filled and the friction clutch JK disengaged conveniently when the speed of the turbine has been reduced to a conveniently small value. It will be appreciated that the hydraulic clutch PQ will function to absorb power and thus have the effect of applying a braking action to the load shaft LS during such time as the friction clutch JK is engaged or hydraulic clutch LN operative; when the friction clutch JK has been disengaged, the hydraulic clutch elements L and Q, which, by virtue of their connection, will be oppositely rotated, namely the one, L, by the ahead driven shaft GS and the other, Q, by the astern driven shaft HS, will act through the working fluid on the co-operating parts N and P, accordingly to absorb the idling load of the turbine.

With the hydraulic clutch LN empty and the hydraulic clutch PQ filled, or partially so, and with the friction clutch JK disengaged, the load shaft will be coupled to the shaft HS and thus driven by the turbine in what may be referred to as the astern direction, namely, in the case of a ship or other mobile craft the direction appropriate for running astern.

The arrangement illustrated in Figs. 2, 2a, 2b and 2c is similar to that just above described except insofar as it is specifically adapted for use in conjunction with a turbine of the contra-rotational type.

Referring to Figs. 2, 2a, 2b and 2c, the shafting includes a solid shaft TS1 and surrounding hollow shaft TS which respectively represent, or are otherwise attached to, the mutually-reacting contra-rotational members of the turbine with which the transmission gearing is intended to be employed. The sleeve shaft TS has fast thereto a pinion A whilst the shaft TS1 has fast thereto a pinion A1. The pinion A1 is meshed with a plurality, in this case three, of circularly distributed gear wheels E2 carried on respective lay shafts LS1 journalled in the frame F on fixed axes parallel with the shafts TS and TS1; the pinion A has meshed with it a plurality, in this case three, of circularly distributed gear wheels B carried on respective lay shafts LS2 journalled in frame F on fixed axes parallel to the shafts TS and TS1.

The lay shafts LS1 have fast thereto respective pinions E1 axially spaced from gear wheels E2 and in mesh with gear wheel G fast with shaft GS which is herein referred to as the ahead driven shaft. The lay shafts LS2 have attached thereto respective pinions D1 axially spaced from the gear wheels B and adapted to mesh with gear wheel H fast with sleeve shaft HS which is herein referred to as the driven astern shaft; the pinions D1 are extended in the axial direction to form, or otherwise carry, further pinions D2 adapted to mesh with the pinions E1 so as to provide therewith a closed gear train in mesh with gear wheel G.

With the arrangement so far described the inner turbine shaft TS1 will rotate the ahead driven shaft GS in one direction and the astern driven shaft HS in the opposite direction, the outer turbine shaft TS assisting in such rotations.

The clutch arrangements and association of the oppositely rotating ahead and astern driven shafts GS and HS respectively, with the load shaft LS are the same as described in connection with the arrangement illustrated in Fig. 1, and the conditions for ahead running or astern running or with the load shaft stopped while the turbine continues to operate, are as described with reference thereto.

The arrangement illustrated in Figs. 3, 3a, 3b and 3c is specifically adapted for use in conjunction with a contra-rotational turbine and is somewhat simplified, as hereinafter explained, in relation to the arrangements of Figs. 1 and 2.

In the transmission gearing of Figs. 3, 3a, 3b and 3c, the shafting comprises a hollow shaft TS1 and the surrounding concentric hollow shaft TS which represent contra-rotational elements constituting, or otherwise attached to, the mutually-reacting contra-rotational members of the turbine with which the gearing is intended to be employed.

The outer shaft TS has fixed to it a pinion A having meshed with it a plurality, in this case three, of circularly distributed gear wheels B carried on respective lay shafts LS1 journalled in the frame F on fixed axes parallel with the axes of shafts TS and TS1; the inner shaft TS1 has fixed to it a pinion A1 having meshed with it a plurality, in this case three, of circularly distributed gear wheels E2 carried on respective lay shafts LS2 journalled in frame F on fixed axes parallel with the axes of shafts TS and TS1. The lay shafts LS2 also carry a plurality, in this case three, of circularly distributed gear wheels E3 axially spaced from the gear wheels E2, the axes of lay shafts LS2 being staggered, or individually intermediate between, the axes of lay shafts LS1, and the gear wheels E3 meshing with gear wheels B to form therewith a closed train in mesh with pinion A. Lay shafts LS1 also carry a plurality, in this case three, of circularly distributed gear wheels D meshing with a gear wheel H which is fast to sleeve shaft HS constituting what is herein termed the astern driven shaft.

In this embodiment, the turbine shaft TS1 is continued through the sleeve shaft HS and constitutes what is herein termed the ahead driven shaft, the omission of a separate ahead driven gear wheel and shaft thereby enabled being an important simplification over the arrangements of Figs. 1 and 2 respectively.

With the arrangements so far described with reference to Figs. 3, 3a, 3b and 3c, it will be evident that, with the turbine shafts TS and TS1 rotating normally in opposite directions, the astern driven shaft HS will be continuously rotated in opposite directions to that in which rotates the ahead driven shaft, that is, turbine shaft TS1.

The transmission gearing of Fig. 3 also includes a mechanical friction clutch JK and two-power-absorbent hydraulic clutches LN, PQ, all enclosed in casing M, the clutches being of the type and general arrangement described with reference to Fig. 1. In this embodiment the clutches are mounted on an extension of the shaft TS1, within a continuation of frame F which is suitably adapted to receive journals of the casing M.

As shown, the friction clutch element K, rigid with casing M, is rotatable relatively to shaft TS1 but is rigid with an intermediate shaft IS which, as indicated, is coupled to the load shaft LS through reduction gearing RG; the co-operating clutch element J is rigid with shaft TS1 and with the element L of the hydraulic clutch LN; the other element N of clutch LN is fast, through casing M, with the element P of hydraulic clutch PQ and is rotatable therewith relatively to shaft TS1; the element Q of hydraulic clutch PQ is rotatable relatively both to casing M and to shaft TS1 but is rigid with the astern driven shaft HS.

With the arrangements described, it will be evident that the friction clutch element J and hydraulic clutch element L will at all times run at the speed of the turbine shaft TS1; it is for this reason that it is desirable to include intermediate shaft IS and reduction gearing RG between the clutch JK and the load shaft.

In operation, when hydraulic clutches LN and PQ are empty, and friction clutch JK engaged, the load shaft LS will be connected to the turbine shaft TS1 and through that to the other turbine shaft TS, and accordingly driven at desired reduced speed in say the ahead direction, clutch element Q meanwhile being rotated oppositely to shaft TS1; for stopping, the energy input to the turbine will be reduced, conveniently by fuel control, and the hydraulic clutches LN and PQ will be filled or partially so, whereupon the clutches LN and PQ will absorb power and so act to brake the load shaft LS and when the friction clutch is disengaged at a conveniently low speed of the turbine, the load shaft will come to rest, the clutches LN and PQ thereafter absorbing the idling load of the turbine; with hydraulic clutch LN empty and clutch PQ filled, and with the friction clutch JK disengaged, the load shaft LS will be connected to the astern driven shaft HS and through that shaft to both the turbine shafts TS and TS1 and thus rotated at desired low speed in the reverse or astern direction.

I claim:

1. In gearing for driving a load shaft from an elastic fluid turbine, in combination with a load shaft, driving shafting, lay shafts having fixed axes parallel to and surrounding said shafting, driving gearing on said shafting, intermediate gearing on said lay shafts meshing with said gearing on said shafting, oppositely rotatable members, gears on said members driven by said intermediate gearing and adapted to rotate said members in opposite directions, and two independently controllable clutches capable when slipping of absorbing considerable power and having their relatively movable parts respectively connected to said oppositely rotatable members and to said load shaft whereby by selected operation of said clutches said load shaft may be driven in either one direction or the other or be stopped while the driving shafting is still rotating.

2. Gearing according to claim 1 wherein said shafting comprises a driving shaft having unidirectional rotation and having a pinion fast thereto and said lay shafts and intermediate gearing are arranged in two sets with the lay shafts of the respective sets having their axes alternatively arranged around the axis of said driving shaft, the gears of said two sets having the end gears thereof rotating in opposite directions, said end gears being in mesh with the gears on said oppositely rotatable members.

3. Gearing according to claim 1 wherein said shafting comprises two contra-rotational driving shafts having pinions respectively fast with said shafts, said lay shafts and gearing thereon being arranged in two sets with the driving gears of the respective sets respectively in mesh with the respective pinions on said driving shafts, the gearing of said respective sets including gears in mesh respectively with the gears on said oppositely rotating members and the gearing of one of said sets including a second gear in mesh with a gear of the first named set whereby one of said relatively rotatable members may be driven through both sets of gears.

4. Gearing according to claim 1, wherein said shafting comprises two contra-rotational driving shafts having pinions respectively fast with said shafts, said lay shafts and gearing thereon being arranged in two sets disposed in alternation around said driving shafts with the driving gears for the respective sets respectively in mesh with the respective pinions on said driving shafts, the gearing of one of said sets including a gear in mesh with the gear on one of said oppositely rotating members and the gearing of the other of said sets including axially aligned gears one of which is in mesh with a gear on the other of said oppositely rotating members and the other of which is in mesh with a gear of said first named set.

5. Gearing according to claim 1, wherein said shafting comprises two contra-rotational driving shafts having pinions respectively fast with said shafts, said lay shafts and gearing thereon being arranged in two sets with the driving gears of the respective sets respectively in mesh with the respective pinions on said driving shafts, the gearing of said respective sets including gears in mesh respectively with the gears on said oppositely rotating members, and a direct driving connection between one of said contra-rotational driving shafts and one of said oppositely rotatable members.

6. Gearing according to claim 1 including an additional mechanical friction clutch associated with said first named clutches and having its relatively rotatable parts respectively in driving connection with said load shaft and one of said oppositely rotatable members.

7. Gearing according to claim 1 wherein each of said clutches is of the hydraulic type.

8. Gearing according to claim 1, wherein said shafting comprises two contra-rotational driving shafts having pinions respectively fast with said shafts, said lay shafts and gearing thereon being arranged in two sets with the driving gears of the respective sets respectively in mesh with the respective pinions on said driving shafts, the gearing of said respective sets including gears in mesh respectively with the gears on said oppositely rotating members, a direct driving connection between one of said contra-rotational driving shafts and one of said oppositely rotatable members, and one of said sets including a gear meshing with a gear on said last referred to shaft.

9. Gearing according to claim 1 wherein an element of one of said clutches is fast with an element of the other clutch.

10. Gearing according to claim 1 wherein said oppositely rotating members are coaxial shafts, one being a sleeve shaft surrounding the other shaft, and said clutches each have one of its relatively rotatable parts fast with one of said shafts, the other relatively rotatable parts of said clutches being united together.

11. Gearing according to claim 1 including an additional friction clutch associated with said first named clutches and having one of its relatively rotatable parts fast with the load shaft and the other of its relatively rotatable members fast with one of the relatively rotatable parts of one of said first named clutches.

12. Gearing according to claim 1 including a friction clutch associated with said first named clutches and having one of its relatively rotatable parts fast with said load shaft and the other of its relatively rotatable parts fast with one of the relatively rotatable members of one of said first named clutches, said first named clutches having their relatively rotatable parts respectively connected to the load shaft and respectively to said relatively rotatable members.

13. In a power transmission mechanism between two contra-rotational driving shafts and a reversible driven shaft coaxial therewith, two concentric intermediate shafts, two pinions respectively fast with the contra-rotational driving shafts, a closed gear wheel train including sets of gear wheels each carried on respective lay shafts having fixed axes distributed around said pinions with the axes of one set individually intermediate between the axes of the other set, the gear wheels of one set meshing with the pinion fast with one of said contra-rotational driving shafts and their lay shafts carrying respective gear wheels meshing with a gear on one of said concentric intermediate shafts for rotating the same clockwise, and the gear wheels of the other set meshing with the pinion fast with the other of said contra-rotational driving shafts and their lay shafts carrying respective gear wheels meshing with a gear on the other of said concentric intermediate shafts for rotating the same counterclockwise, in combination with two fluid slip couplings each having a rotatable driving element and a rotatable driven element fluid-coupleable with said driving element, the driving elements of said couplings being fast respectively with the concentric intermediate shafts and the driven elements of said couplings being fast each with the reversible driven shaft.

14. In a power transmission mechanism including two contra-rotational driving shafts including an elongated inner shaft and an outer concentric sleeve shaft and a reversible driven shaft coaxial with said inner and outer driving shafts, the combination of two pinions respectively fast with said inner and outer driving shafts, an intermediate sleeve shaft rotatably mounted on said elongated driving shaft and having fast with it a gear wheel, two sets of gear wheels carried on lay shafts having fixed axes and distributed around said pinions with the axes of one set individually intermediate between the axes of the other set so as to form a closed gear wheel train in which the gear wheels of one set mesh with the pinion fast to the outer driving shaft for rotation thereby clockwise and for rotating the gear wheels of the other set counterclockwise, the lay shafts of said clockwise-rotated gear wheels carrying respective additional gear wheels all meshing with the gear wheel fast with the intermediate sleeve shaft, and the lay shafts of said counterclockwise-rotated gear wheels carrying respective additional gear wheels meshing with the pinion fast with said inner driving shaft, and two independently controllable fluid slip couplings each having a rotatable driving element and a rotatable driven element fluid-coupleable with said driving element, the driving element of one coupling being fast with said inner driving shaft and the driving element of the other coupling being fast with said intermediate sleeve shaft and the driven elements of said couplings being both fast with said reversible driven shaft.

KARL BAUMANN.

REFERENCES CITED

The following references are of record in the file of this patent:

UNITED STATES PATENTS

| Number | Name | Date |
|---|---|---|
| 1,420,272 | Matthews | June 20, 1922 |
| 1,987,985 | Bauer et al. | Jan. 15, 1935 |
| 2,045,615 | Rosle et al. | June 30, 1936 |
| 2,171,715 | Sinclair | Sept. 5, 1939 |
| 2,301,294 | Kuhns et al. | Nov. 10, 1942 |
| 2,315,808 | Miller | Apr. 6, 1943 |
| 2,347,906 | Hatcher | May 2, 1944 |